(12) United States Patent
Delerablee et al.

(10) Patent No.: US 9,178,695 B2
(45) Date of Patent: Nov. 3, 2015

(54) METHOD FOR IDENTIFYING A DEVICE USED BY A HACKED TERMINAL, AND RELATED DEVICE

(75) Inventors: Cécile Delerablee, Paris (FR); Aline Gouget, Paris (FR); Pascal Paillier, Paris (FR)

(73) Assignee: CRYPTOEXPERTS SAS, Paris (FR)

( * ) Notice: Subject to any disclaimer, the term of this patent is extended or adjusted under 35 U.S.C. 154(b) by 91 days.

(21) Appl. No.: 13/636,496

(22) PCT Filed: Mar. 21, 2011

(86) PCT No.: PCT/FR2011/050580
§ 371 (c)(1),
(2), (4) Date: Nov. 29, 2012

(87) PCT Pub. No.: WO2011/117525
PCT Pub. Date: Sep. 29, 2011

(65) Prior Publication Data
US 2013/0212374 A1      Aug. 15, 2013

Related U.S. Application Data

(60) Provisional application No. 61/321,184, filed on Apr. 6, 2010.

(30) Foreign Application Priority Data

Mar. 23, 2010   (FR) ...................... 10 52108

(51) Int. Cl.
*H04L 29/06* (2006.01)
*H04L 9/08* (2006.01)
(Continued)

(52) U.S. Cl.
CPC *H04L 9/08* (2013.01); *H04L 9/083* (2013.01); *H04N 21/2585* (2013.01); *G06F 17/30017* (2013.01); *H04L 2209/603* (2013.01); *H04L 2209/606* (2013.01); *H04N 21/4181* (2013.01)

(58) Field of Classification Search
CPC . H04L 9/08; H04L 2209/606; H04L 2209/60; G06F 17/30017
USPC .......................................................... 713/150
See application file for complete search history.

(56) References Cited

U.S. PATENT DOCUMENTS 7,995,603 B2 * 8/2011 Revital et al. ................. 370/432
8,204,220 B2 * 6/2012 Candelore ....................... 380/44
(Continued)

FOREIGN PATENT DOCUMENTS

EP       1 331 751 A1     7/2003
EP       1 631 085 A1     3/2006
(Continued)

OTHER PUBLICATIONS

International Search Report (PCT/ISA/210) issued on Jul. 18, 2011, by the French Patent Office as the International Searching Authority for International Application No. PCT/FR2011/050580.
(Continued)

*Primary Examiner* — Hadi Armouche
*Assistant Examiner* — Bryan Wright
(74) *Attorney, Agent, or Firm* — Buchanan Ingersoll & Rooney PC

(57) ABSTRACT

The invention relates to a method for preventing the fraudulent use of an electronic device and thus for effectively combating the fraudulent dissemination of protected content. The invention further relates to such a device as well as to a method enabling permanent revocation thereof if the device is considered to be unlawfully used or optional reinstatement of the device.

20 Claims, 5 Drawing Sheets

(51) Int. Cl.
*H04N 21/258* (2011.01)
*G06F 17/30* (2006.01)
*H04N 21/418* (2011.01)

(56) References Cited

U.S. PATENT DOCUMENTS

| | | | |
|---|---|---|---|
| 2003/0152234 A1 | 8/2003 | Matsushita | |
| 2003/0196113 A1* | 10/2003 | Brown et al. | 713/201 |
| 2004/0170278 A1* | 9/2004 | Schipper | 380/239 |
| 2005/0278257 A1 | 12/2005 | Barr et al. | |
| 2006/0046640 A1 | 3/2006 | Ooi | |
| 2007/0133797 A1 | 6/2007 | Schipper et al. | |
| 2007/0180231 A1* | 8/2007 | Morten et al. | 713/158 |
| 2007/0280476 A1 | 12/2007 | Matsushita | |
| 2008/0294786 A1* | 11/2008 | Tinker et al. | 709/229 |
| 2009/0019468 A1* | 1/2009 | Ganesan et al. | 725/25 |
| 2009/0290711 A1 | 11/2009 | Bloom et al. | |
| 2011/0280399 A1* | 11/2011 | Chieze et al. | 380/255 |
| 2012/0134530 A1* | 5/2012 | Sarda et al. | 382/100 |
| 2013/0031576 A1* | 1/2013 | Koemmerling | 725/31 |
| 2013/0046969 A1* | 2/2013 | Dubroeucq et al. | 713/150 |
| 2013/0308776 A1* | 11/2013 | Delerablee et al. | 380/46 |
| 2013/0326211 A1* | 12/2013 | Delerablee et al. | 713/150 |

FOREIGN PATENT DOCUMENTS

| | | |
|---|---|---|
| WO | WO 2005/048603 A1 | 5/2005 |
| WO | WO 2008/013562 A1 | 1/2008 |

OTHER PUBLICATIONS

Written Opinion (PCT/ISA/237) issued on Jul. 18, 2011, by the French Patent Office as the International Searching Authority for International Application No. PCT/FR2011/050580.

* cited by examiner

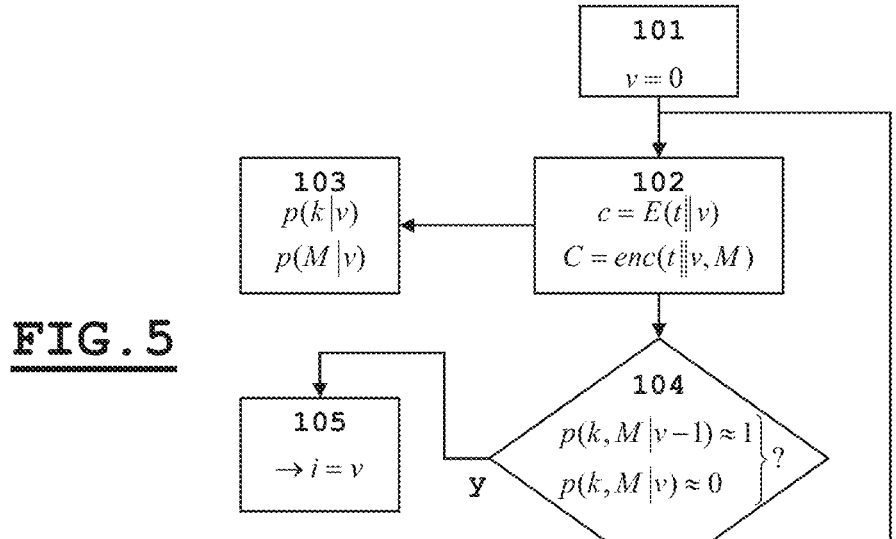

METHOD FOR IDENTIFYING A DEVICE USED BY A HACKED TERMINAL, AND RELATED DEVICE

The invention relates to a method for preventing a lawfully acquired and installed electronic device from being used by a pirate terminal. The invention thus makes it possible effectively to combat the fraudulent dissemination of protected multimedia content.

The invention also relates to the adaptation of said devices as well as to a method for triggering permanent revocation of an electronic device or the possible reinstatement thereof, respectively. A digital content broadcasting operator generally operates a conditional access system (CAS) in order to disseminate protected content to a subscriber or a plurality of subscribers. Such a system generally uses protected electronic devices, such as chip cards, to host the identities and/or rights of the subscribers and to perform encryption, decryption or number-generation operations.

In order to broadcast protected multimedia content, encrypted control words c and encoded content C are transmitted via a broadcast network, at intervals that are regular or, at least, known and controlled by the broadcaster. An encrypted control word is generally obtained by means of an encryption function E such that $c=E(k)$, k being the value of said control word. Encoded content C, on the other hand, is obtained by means of an encoding function enc and said control word k, such that $C=enc(k,M)$, M being the unscrambled multimedia content. As an example, the encoding function can comply with the DVB-CSA (Digital Video Broadcasting—Common Scrambling Algorithm) standard. In order to view or listen to protected content, every user must take out a subscription. A subscriber receives a dedicated device, generally in the form of a chip card which, when coupled with a terminal, generally referred to as decoder or set-top box, enables said subscriber to decode protected content. The encrypted control words c are conventionally decrypted by the subscriber device which issues the control words k to the terminal. The latter is responsible for decoding encoded content C and makes it possible, by means of a suitable human-machine interface —for example a living-room television set—to access the unscrambled content M.

It is common for hacker entities to attempt to conduct unlawful trade aimed at broadcasting, over a pirate network, unscrambled content M or unencrypted control words k that make it possible to decode protected content C using a terminal adapted for said purpose. The first threats and attacks have driven hackers to attempt to "crack" the security of electronic subscriber devices. Through knowledge of cryptographic equipment, algorithms or secrets, a hacker can then "clone" or emulate such a device and make some of said "reproductions" available to dishonest subscribers.

The increasing, almost impregnable robustness of such devices has driven hackers to lawfully acquire subscriber devices (such as chip cards) and to design pirate terminals, capable of interacting with said devices and of broadcasting the unencrypted control words k or even decoded content M, in real time, over a pirate channel or network such as, for example, the Internet. This threat is known as "card sharing" or "control word sharing".

In order to combat the hackers, operators generally manage to uncover the existence of such a pirate network. By taking out a subscription with a hacker, an operator can also obtain a "cloned" or emulated device and study same. However, in the "control word sharing" scenario, there are no known methods for remotely identifying a device which, although correctly acquired and installed, is used fraudulently. There are no methods for optionally revoking such a device remotely, without requiring a modification of the hardware and software architecture of the broadcast networks and/or the existing lawful terminals and without causing especially penalising disruption to regular subscribers during their access to protected content.

The invention addresses all the disadvantages raised by the known solutions. Among the many advantages provided by the invention, it should be mentioned that the invention makes it possible remotely to track any subscriber device that has enabled the production of a control word of which the value can be transmitted over a pirate network. The invention also makes it possible, as an alternative, to track any subscriber device that has produced a control word that has made it possible to decode protected content and in which the unscrambled contents is broadcast over said pirate network. The invention also makes it possible to revoke such a device—referred to as "traitor device"—remotely, while continuing to broadcast content via the broadcast network. The invention thus offers every content broadcast operator an especially simple and effective tool for combating hackers.

To this end, the invention provides a method for producing a control word k', said method being used by a processing means of an electronic device interacting with a terminal, said device comprising a means for receiving an encrypted control word c from the terminal and a means for issuing said produced control word k' to said terminal. Such a method comprises a step of applying a decryption function D to the encrypted control word c and thus of calculating a decrypted word k, such that $k=D(c)$. According to the invention, the decrypted word k comprises a component v and the method also comprises a step of producing the control word k' respectively identical to or different from k according to the result of a comparison operation between the values of v and an identifier i that is exclusive to the device.

According to one advantageous embodiment, the step of producing the control word k' that is distinct from k can consist of producing a word $k'=kf$ in which the value kf is different from the value of k.

As an alternative, the step of producing the control word k' that is distinct from k can consist of using a delay function such that the issuing means issues said control word $k'=kd$, in which the value kd is equal to k, after a pre-determined period of time.

According to one embodiment, the step of producing the control word k' can consist of producing a word that is identical to k if the value of the component v is strictly lower than the value of the identifier i and distinct from k if the value of the component v is no lower than the value of the identifier i.

As an alternative, the invention can provide for:
the identifier i to be a vector of z integers with values $i=(i, \ldots, i_z)$ comprised in a set [1,m], m and z being integers higher than 1;
the component v to be a vector of z integers with values $v=(v_1, \ldots, v_z)$ comprised in a set [0,m].

In this case, the step of producing the control word k' can consist of producing a word that is:
identical to k if the value of each integer $v_1$ is respectively strictly lower than the value of each integer $i_1$ for every l comprised between 1 and z,
distinct from k, otherwise.

In order to use such a method, the invention also provides an electronic device interacting with a terminal, said device comprising:
a means for receiving an encrypted control word c from the terminal;

a processing means for producing a control word k' according to said encrypted control word c;
a means for issuing said terminal with said control word produced in response to receiving the encrypted control word c.

According to the invention, such a device comprises a means for storing an identifier i and the processing means is arranged such as to use a method in accordance with the invention for producing the control word k.

The invention provides for such a device to be able to comprise a means for using a delay function interacting with the processing means and for said processing means to be able to be arranged such as to use a method in accordance with the invention such that the control word k' can be issued by the issuing means after a pre-determined period of time.

It is also provided for the electronic device to be able to comprise a means for storing information Rp indicating permanent revocation of said device or even to be able to comprise a means for storing or generating a word with a value kf that is distinct from the value of k.

The invention also provides various embodiments of a method for identifying an electronic device, such as described above, interacting with a pirate terminal capable of broadcasting a control word k' via a pirate network. Such a method comprises:
- a step of producing a control word k which consists of determining the value of a component v of said control word;
- a step of producing an encrypted control word c by encrypting said control word k by means of an encryption function E, such that c=E(k);
- a step of broadcasting said encrypted control word c via a broadcast network towards terminals, including said pirate terminal;
- a step of observing the pirate network which consists of measuring a probability p(k|v) of noticing the actual transmission of a control word k' with value k, knowing the value of v;
- an identification step which consists of returning a value directly linked to the identifier i of a device that has produced a control word k' broadcast via the pirate network, according to the value of v and the measurement of said probability p(kv).

The invention also provides various embodiments of a method for identifying an electronic device interacting with a terminal capable of broadcasting via a pirate network content M' previously produced by said terminal, decoding encrypted content C by means of a control word k' and a decoding function dec such that M'=dec(k',C), said control word k' having been produced by said device, in accordance with the invention, from an encrypted control word c transmitted together with C over a broadcast network.

Such a method comprises:
- a step of producing a control word k which consists of determining the value of a component v of said control word;
- a step of producing an encrypted control word c by encrypting said control word k by means of an encryption function E such that c=E(k);
- a step of producing encrypted content C by encoding content M by means of said control word k and an encoding function enc such that C=enc(k,M);
- a step of broadcasting said encrypted control word c together with said encrypted content C via the broadcast network towards terminals including said pirate terminal;
- a step of observing the flow of said pirate network which consists of measuring a probability p(M|v) of noticing the actual transmission of content M' with value M, knowing the value of v;
- an identification step which consists of returning a value directly linked to the identifier i of a device that has produced a control word k' that has been used by the pirate terminal to create content M' broadcast via the pirate network, according to the value of v and the measurement of said probability p(M|v).

Further features and advantages will appear more clearly from reading the following description and examining the supporting figures, among which:

Figure 2A:
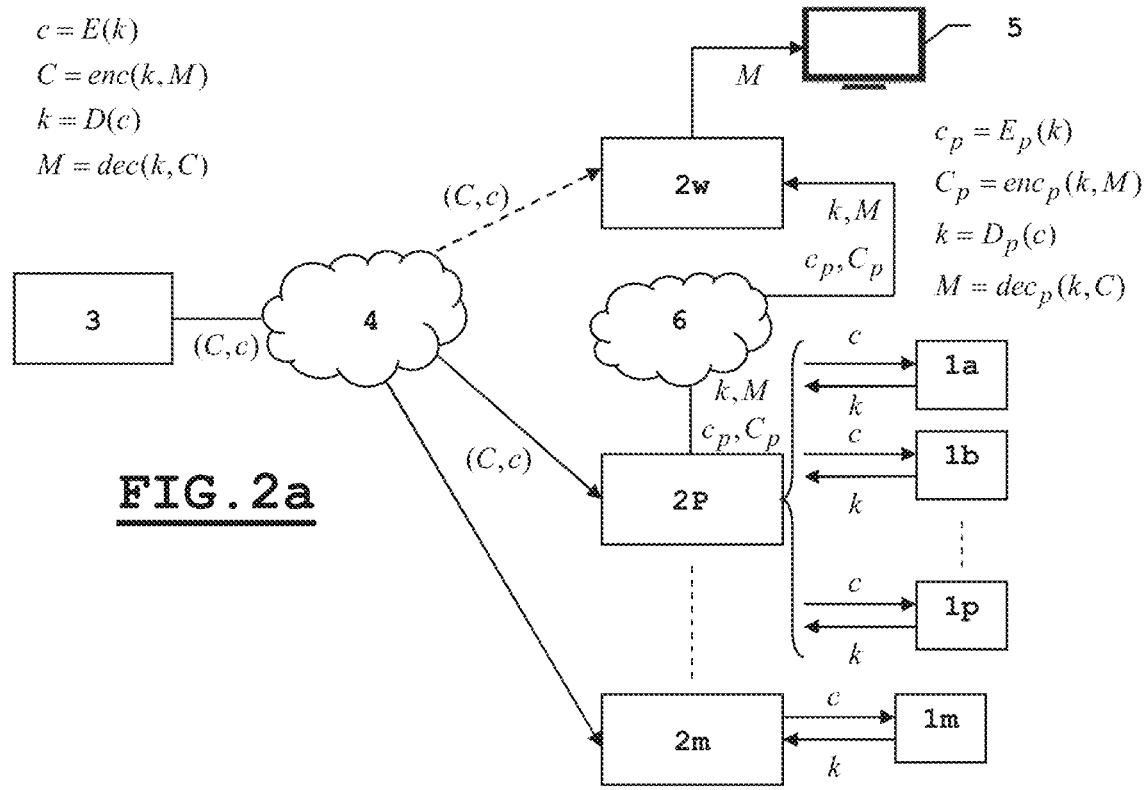
FIG. 2a shows solutions for attempting to carry out hacking of protected multimedia content broadcast over a broadcast network according to the prior art.
Figure 2B:
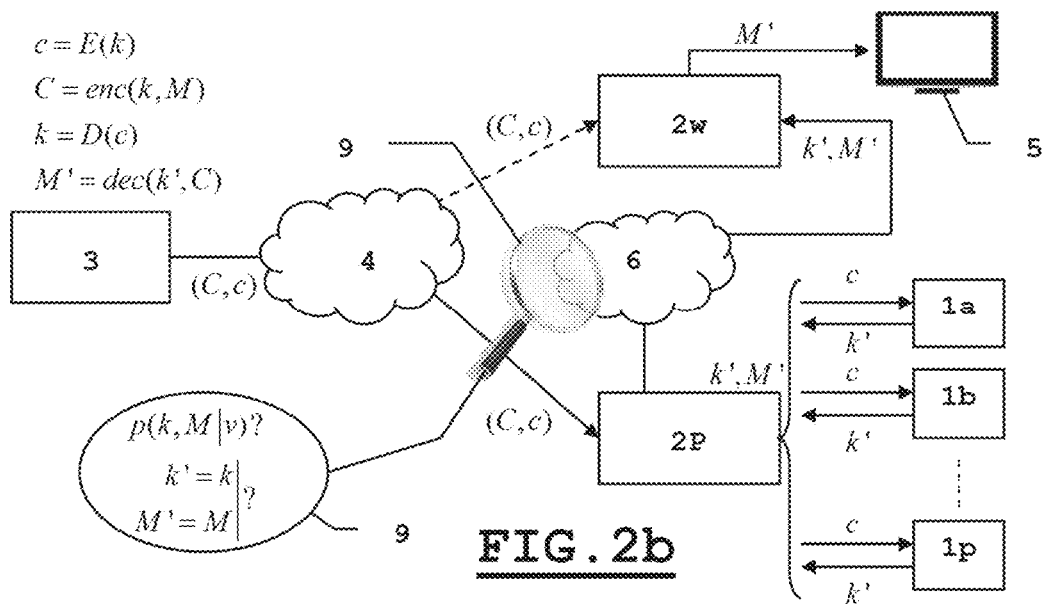
Figure 4A:
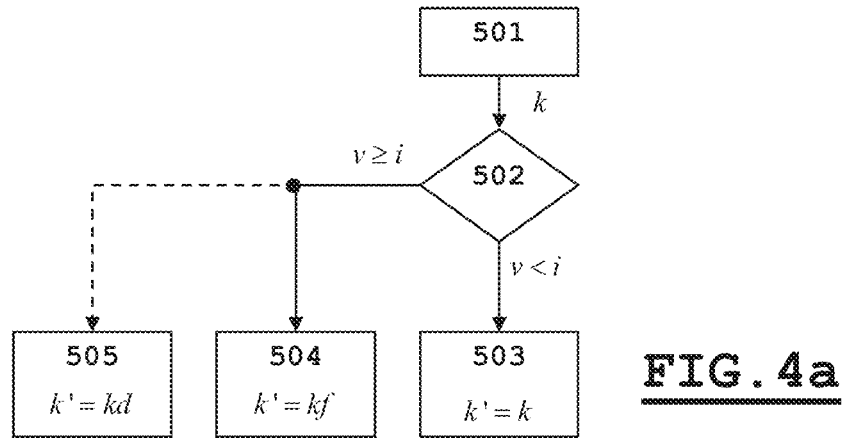
Figure 4B:
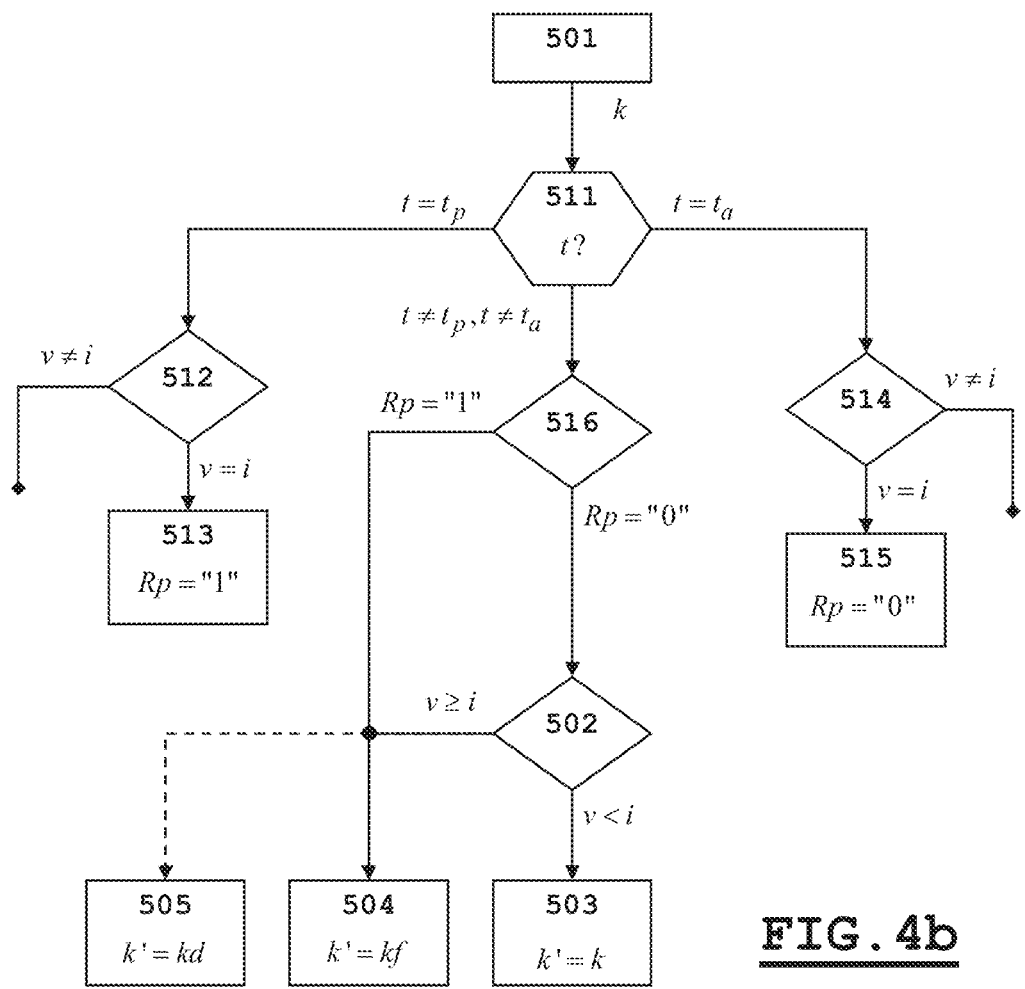
Figure 7:
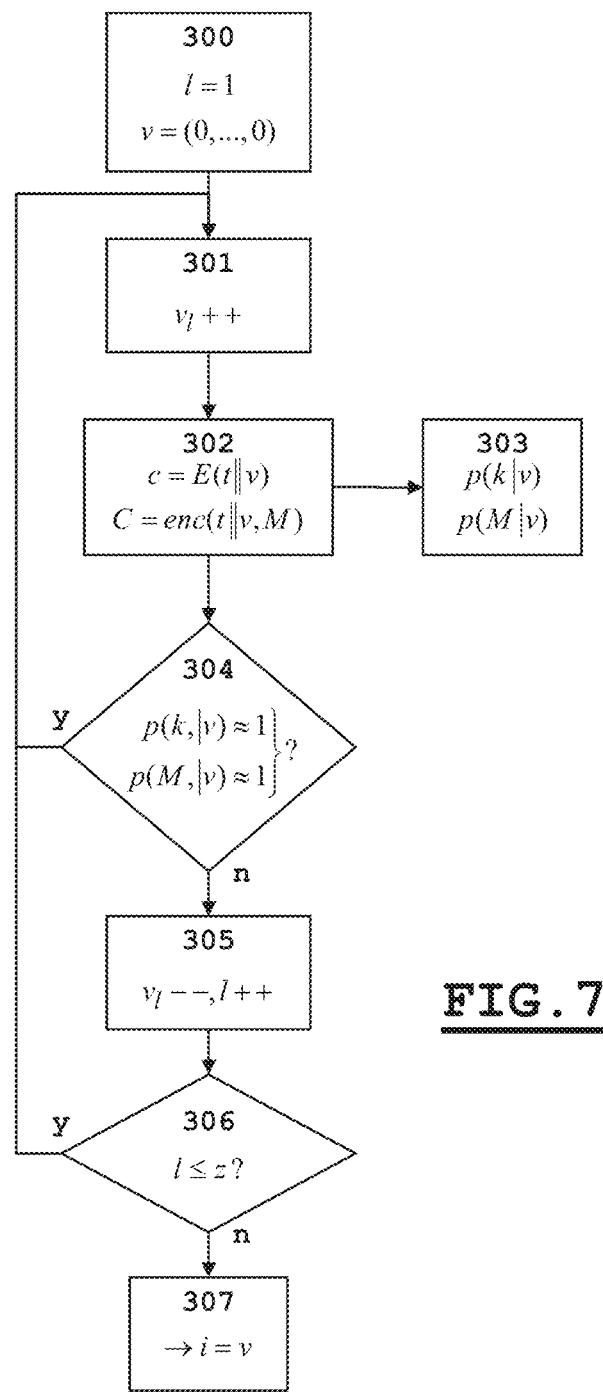

FIGS. 4a and 4b respectively depict two embodiments of a method for producing a control word, said method being carried out by an electronic device in accordance with the invention;

FIGS. 5, 6 and 7 respectively describe three embodiments of a method, in accordance with the invention, for observing a pirate network and identifying a fraudulently used electronic device;

FIG. 2b describes the performance, according to the invention, of such a method for observing a pirate network and identifying a fraudulently used electronic device.

Figure 1:
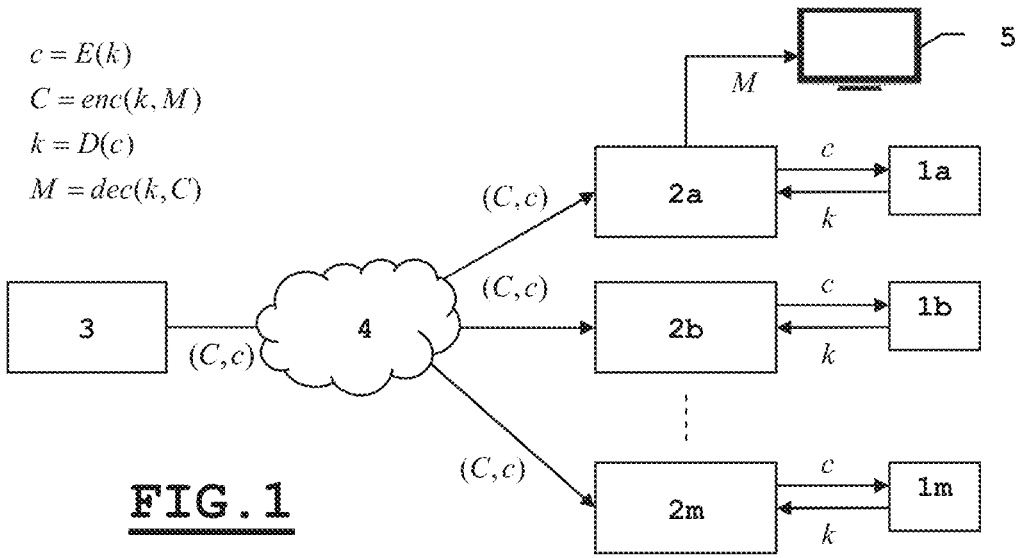
FIG. 1 shows a network for broadcasting protected multimedia content according to the prior art.

FIG. 1 shows a broadcast network 4 used by an operator broadcasting protected content. Thus, a content server 3 broadcasts control words c together with content C, respectively encrypted and encoded. For this purpose, the server 3 encodes unscrambled content M by means of an encoding function enc and a control word k, the latter being produced by said server 3. Encoded content C is thus obtained such that C=enc(k,M). An encryption c of the control word k is also broadcast together with the encoded content C. For this purpose, the server encrypts said control word k by means of an encryption function E in order to obtain c such that c=E(k).

The encrypted control words c and the encrypted content C are transmitted, via the broadcast network 4, to terminals 2a to 2m. The latter are responsible, respectively, for decoding the encoded content C broadcast by the server 3 in real time. Thus, a terminal—such as, for example, the decoder 2a—uses a decoding function dec and applies same to the encoded content C in order to obtain the unscrambled content M. The latter can be viewed using a living-room television set 5 or any other suitable interface. In order to apply the decoding function dec, a terminal must know the value of the control word k which was used by the server 3 to encode the content M. According to the prior art and in accordance with FIG. 1, a terminal 2a to 2m receives an encrypted control word c such that c=E(k) and transmits same to a protected electronic device 1a to 1m, generally exclusive to one subscriber. The terminal 2a regularly receives, by means of the network 4, pairs (C, c) and transmits the encrypted control words c to a device 1a. The device 1a can decrypt an encrypted control word c by means of a decryption function D in order to obtain the control word k that was used to encode content M. Thus, k=D(c). The same applies to any other terminal, such as 2b to 2m, each interacting respectively with one device 1b to 1m. According to an alternative embodiment, the server 3 can use a secret, for example in the form of a key Kc, to encrypt a control word k. Thus, c=E(Kc,k). In this case, a device, such as the device 1a to 1m, uses a reciprocal decryption function D, such that k=D(Kd,k) in which Kd is a decryption key known to the device. According to the encryption E and decryption functions D, the keys Kc and Kd can be identical. This is the case of symmetric encryption/decryption. Alternatively, according to a system referred to as "broadcast encryption", Kc is a public or secret key that is exclusive to the operator and Kd is a secret key that is exclusive to the device and known to the operator. According to this alternative, a plurality of individual decryption keys exist and each one of said devices, lawfully issued and sent to the subscribers of said operator, has one such individual decryption key.

FIG. 2a depicts a first scenario in which a hacker organisation, hereinafter referred to as the "hacker", manages to conduct fraudulent trade in protected content.

According to said first scenario, the hacker has taken out a subscription with a content operator in a completely normal fashion. This enables the hacker to obtain an electronic subscriber device, such as a chip card 1a. The hacker is also in possession of a terminal 2P, referred to as pirate terminal. Said terminal can receive pairs (C,c) from a broadcast network 4 such as that described in connection with FIG. 1. The terminal 2P can interact with said device 1a in order to transmit to same the encrypted control words c. In response, the device 1a produces the control word k by decrypting the cypher c by means of a decryption function D. The device 1a issues the terminal 2P with the control word k in an entirely normal fashion. According to said first scenario, the pirate terminal 2P can then transmit the control words k via a pirate network 6 in real time. A dishonest user that has "taken out" a subscription from the hacker, can own a terminal 2w. The latter is adapted such as to receive, on the one hand, from the broadcast network 4, encoded content C (dotted arrow) and, on the other hand, from the pirate network 6, the related control words k, unscrambled. The terminal 2w can decode the encoded content C and issue unscrambled content M in order for the latter to be viewed.

According to a second scenario, the terminal 2P decodes the encoded content C and transmits the unscrambled content M in real time via the pirate network 6. The terminal 2w is then merely an interface for receiving the content M and transmitting same to the interface 5 in order for the dishonest subscriber to be able to enjoy the protected content fraudulently.

In both the first and second scenarios, a hacker can take out a plurality of subscriptions from one or more operators. A pirate terminal 2P can then simultaneously interact with a plurality of subscriber devices 1a to 1p and use a more or less complex algorithm to manage said devices. For example, the pirate terminal transmits a control word k decrypted mainly by the devices 1a to 1p. As an alternative, such a terminal 2P can request a specific electronic device at random, etc.

A hacker can, as an alternative, optionally encrypt or encode, according to a proprietary method, the control words k and/or the content M broadcast over a pirate network. Thus, said pirate network can respectively transmit a cypher $c_p = E_p(k)$ – $E_p$ being a proprietary encryption function of the hacker—or $C_p = enc_p(M)$ – $enc_p$ being a proprietary encoding function of the hacker. A terminal 2w comprises, in said case, reciprocal decryption $D_p$ and/or decoding functions $dec_p$ for ultimately issuing the expected unscrambled content $k = D_p(c_p)$ and/or $M = dec_p(C_p)$.

The invention makes it possible to thwart these various hacking scenarios.

Figure 3:
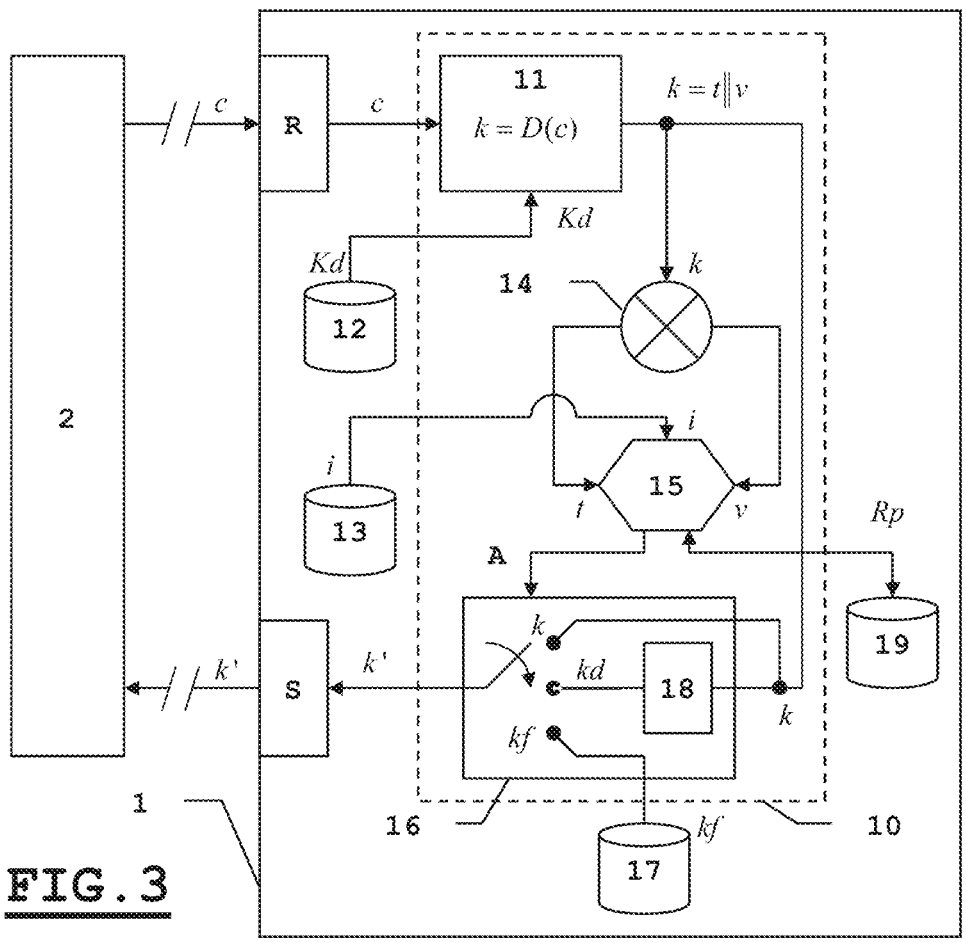
FIG. 3 depicts the operational architecture of an electronic subscriber device in accordance with the invention.

FIG. 3 illustrates various embodiments provided by the invention for adapting an electronic subscriber device 1.

According to the prior art, such a device comprises a means R for receiving from the outside world—for example from a terminal 2 encrypted content c. Such a device 1 comprises a processing means 10 for using 11 a decryption function D such that k=D(c) and for producing a control word k. Optionally, such a device can use a function D coupled with a decryption key Kd such that k=D(Kd,c). The key Kd is then generally stored by a storage means 12.

According to the prior art, the control word produced k is issued by the device 1, via a means S, to a terminal 2. The invention provides for adapting such a device 1 in order to issue a control word k' instead of the word k. For this purpose, the invention provides for the server 3, described in connection with FIG. 1, to produce a control word k before encryption, comprising a component v with a pre-determined value. Thus, such a control word k is produced according to a pre-determined value of v by means of a reversible function F such that k=F(v). According to certain embodiments, the function F can be a symmetric encryption using a secret key known to the server 3 and to the device 1.

In addition, the invention provides for a device 1 to comprise a dedicated identifier i. For example, said identifier is stored by a storage means 13 of the device 1. The processing means 10 of the latter comprises a means for interpreting said component v of the control word k obtained after using 11 the decryption function D. According to the value of the identifier i and the component v extracted from k, the device 1 issues a control word k' in which the value is equal to k or distinct from k. The value of k' can depend on the result of a comparison operation 15 between the values of v and i. In other words, the control word k' produced and issued by a device 1, is generated 16 according to the decrypted word k and an identifier i that is exclusive to the device 1.

The processing means 10 decides A that the word k' is identical to the control word k or distinct from the latter. As an example, in order to be distinct from k, k' can have a value kf that is different from that of k. According to one embodiment, the invention provides that k' can be identical to k only if the component v of the control word k is strictly lower than the value of the identifier i. Other combinations or decision-making algorithms A may be used. It suffices for the value of the component v relative to the value of the identifier i to be able to influence the value of the issued control word k'. A value kf can be produced at random, be dependent on k or be read from a storage means 17 of the device 1.

The invention also provides an alternative embodiment in which, instead of producing a control word k' with value kf different from that of k, the value of k' is systematically equal to k but can be changed in time. In the latter case, when the value of v is no lower than i, the processing means 10 uses a delay function 18 or the like, such that the control word k' is issued after a pre-determined period of time d. In this case k'=kd. According to the invention, a word k' is considered to be distinct from k if k'=kf or k'=kd.

The adaptation of an electronic device 1 aims to produce a control word k' in which the value (or the response time) varies according to the content of the control word produced by the server 3. Thus, it is possible for an operator to revoke, in an ephemeral manner, a subscriber device according to the identifier thereof. Indeed, if k' is different from k or issued after a long enough period of time d, k' does not enable C to be decoded. The content M'=dec(k',C) does not correspond to the content M broadcast by the operator.

According to FIG. 2b, it is possible to observe a pirate network 6 in order to measure 9 a probability p(k|v) of seeing a control word k transit in real time, knowing the value of v. By means of the invention, step-by-step, one ephemeral revocation at a time, it becomes possible to identify a device 1 being operated in a fraudulent fashion. Details have been provided hereunder—in connection with FIGS. 5 to 7—of the embodiments of a tracking method in accordance with the invention that makes it possible to identify such a traitor device.

FIG. 4a describes a first example of a method for producing a control word k'. This method can be used by the processing means of an electronic device 1 adapted in accordance with the invention.

Thus, such a method comprises a first step 501 of decrypting an encrypted control word c and obtaining a value k of said control word. The method comprises a step 502 of comparing the value of a component v of the word k and the value of the identifier i of the device 1. According to the example of embodiment depicted in FIG. 4a, the value of the control word k' is;

equal 503 to the value of k if v<i;
equal 504 to a value kf≠k if v≥i.

FIG. 4a also depicts an alternative in which the value of k' can be equal 505—if v≥i—to kd, in other words, equal to k but issued after a pre-determined, characteristic period of time d.

The invention also provides an alternative in which it is possible, remotely and permanently, to revoke an electronic device—adapted in accordance with the invention—in particular if an operator considers the latter to be a traitor device, in other words, a device fraudulently operated by a hacker. FIGS. 3 and 4b depict this alternative.

For this purpose, the invention provides for the control word k produced by a server 3, such as described in connection with FIG. 1, to comprise, in addition to a component v, a second component t. Thus, the value of the control word k can be obtained by applying a reversible function F to the components v and t such that k=F(t,v).

According to one embodiment, the application of said function F can result in the generation of a control word k in which the value is the result of a concatenation of components v and t such that k=t||v.

Other components could furthermore be added to said components v and t. As indicated in FIG. 3, the processing means 10 of a device in accordance with the invention is capable, using a control word k=F(t,v), of finding and interpreting the components v and t. A first embodiment can consist of providing a component t that can have a pre-determined value tp.

In connection with FIG. 4b, a method for producing a control word k' can then comprise a step 511, performed after the step 501 of decrypting the cypher c, in order to interpret the value of the component t. If the latter is equal, for example, to $t_p$, the method comprises a step 513 of writing information Rp (Rp="1") to the memory in order to indicate that the device 1 is permanently revoked. This step is only used if the component v is equal to the identifier i of the device. Moreover, according to this alternative, the method for producing k' does not perform the comparison 502, such as described in FIG. 4a, unless the stored information Rp indicates (Rp="0") that the device is not permanently revoked. Otherwise, the method produces 504 or 505, k'=kf or k'=kd, regardless of the value of v. By producing a control word k=F($t_p$,i), for example k=$t_p$||i, from the server 3, an operator can revoke the device in which the identifier is equal to i, without thereby affecting the broadcast of protected content to its regular subscribers.

The invention also provides an alternative in which it is possible to reinstate a permanently revoked device, in accordance with the preceding method.

In a reciprocal manner, the invention also provides for the component t to be equal to a characteristic value $t_a \neq t_p$. The step 511 then makes it possible to interpret the value of the component t and to trigger a step 515 of deleting possible information Rp indicating permanent revocation of the device (Rp="0"). This step 515 is only used if t=$t_a$ and v=i. Thus, it is possible to use a method for reinstating a revoked device by producing k=F($t_a$, i), for example k=$t_a$||i, in the operator server 3.

As an alternative, the invention provides for the component t to be able to have a characteristic value $t_e$, such that $t_e \neq t_p$ and $t_e \neq t_a$, in order to carryout a method for producing k' in accordance with the invention. Thus, if t≠$t_e$, t≠$t_p$ and t≠$t_a$, then the method for producing k' produces k'=k regardless of the value of v. In this case, a device adapted according to the invention behaves like a device in accordance with the prior art.

According to another alternative, the invention enables an operator to trigger, for a specific device or for all the subscriber devices taken into consideration, an update of the identifier i. Thus, the invention makes it possible to adapt such a device in order for the latter to comprise a means for detecting a specific value of the component t and a means for updating the identifier i of the device.

In the case of an update request that is specific to a device, said specific value can be equal to a pre-determined value t=$t_{iu}$. If t=$t_{iu}$ and v=i, then the device in which the identifier is equal to i=v can update the identifier i thereof. As an example, said means for updating an identifier consists of replacing the current value of the identifier i with the next value i' found in a circular list stored by said device.

As an alternative, said means can be capable of using a function Φ(i) for producing a new value i' of the identifier i, such that i'=Φ(i).

In order to be able to transmit a request for an overall update of the identifiers to all the devices, the invention provides for such a device to be capable of being adapted in order for the detecting means to be capable of detecting a pre-determined value t=$t_{gu}$.

Every device then triggers an update of the identifier i thereof. According to one embodiment, the value of the component v can be used by said means for updating the identifier. Thus, in the context of a list, v can be a range within a list of identifiers, an index for selecting one list from a plurality thereof, or even a diversification element for a function Φ, such that i'=Φ(i, v). Any other embodiment may be considered, in accordance with the invention, as long as an identifier can be updated by a device from the broadcast network.

FIG. 2b depicts the use of a method for observing a pirate network 6 and identifying a traitor device 1a to 1p. FIG. 2b contains the same elements described in connection with FIG. 2a. Thus, a terminal 2P receives pairs (C, c) from a broadcast network 4. The terminal 2P interacts with one or more devices 1a to 1p in order to transmit the encrypted control words c to said devices. In response, a device 1a to 1p produces the control word k by decrypting the cypher c by means of a decryption function D and issues same to the terminal 2P. The latter can broadcast the control words k via the pirate network 6 in real time. A terminal 2w can receive, on the one hand, from the broadcast network 4, encoded content C and, on the other hand, from the pirate network 6, unscrambled control words k. The terminal 2w can decode the encoded content C and issue unscrambled content M in order for the latter to be viewed.

The invention provides for the use of a means 9 for observing the pirate network 6. This observation consists of varying the value of the component v of the control words k produced by the server 3 in real time and according to a method described in connection with FIGS. 5 to 7. Next, for every successive value of v, the probability p(k|v) of the channel or the pirate network 6 operating correctly is measured—in other words, of control words k'=k being transmitted via the network 6. On the basis of this observation, an operator can identify at least one traitor device used by a pirate decoder or terminal 2P, among the devices 1a to 1p. As soon as a traitor device 1i is identified, the latter can be revoked by transmitting an encrypted control word c=E (F($t_p$,i)). Thus, the device with identifier i is permanently revoked. If the pirate network 6 continues to operate correctly, the tracking method described above is repeated until said network 6 ceases to operate—all the traitor devices having been revoked.

As seen for FIG. 2a, a second hacking scenario can consist of no longer broadcasting control words k'=k over the network 6, but instead directly broadcasting unscrambled content M'=M. The measured probability is thus, for a value of v, the probability p(M|v) of seeing content M'=M transit in real time.

In addition, as also seen for FIG. 2a, a third hacking scenario can consist of no longer broadcasting control words k'=k or unscrambled content M'=M over the network 6 but instead broadcasting encrypted content $c_p=E_p(k')$ and/or $C_p=enc_p(M')$. The ability to measure the probability p(k,M|v), for a value of v, of seeing content M'=M or control words k'=k transit in real time implies that the broadcasting operator—or any other entity duly authorised by the latter to use a method for observing a pirate network—is capable of using reciprocal functions $D_p$ and/or $dec_p$ such that $k'=D_p(c_p)$ and/or $M'=dec_p(C_p)$.

FIG. 5 presents a first embodiment of a method for identifying a traitor electronic device 1, 1a, . . . , 1p, in accordance with the invention.

Said tracking method comprises a first step 101 which consists of previously initialising v at 0.

A step 102 enables the server 3 to produce an encrypted control word c by encrypting said control word k=F(t,v), for example k=t||v, by means of an encryption function E, such that c=E(k). An encoded message C=enc(k,M) is generated at the same time. A pair (C,c) is broadcast via a broadcast network towards terminals including a pirate terminal.

A step 103 of observing the pirate network consists of measuring a probability p(k|v) of noticing the actual transmission of a control word k' identical to k, knowing the value of v. "Actual transmission of a control word k' identical to k" is understood to refer to the transmission of such a word, with no time lag connected in particular with the use of a delay function 18 such as described above in connection with FIG. 3. In this case, according to the invention, the delayed transmission of a control word k'=kd is not considered to be an "actual transmission of a control word k' identical to k".

This step can, as an alternative, consist of measuring a probability p(M|v) of noticing the actual transmission of content M' with a value M, knowing the value of v. Said probability will be noted p(k,M|v), covering the two alternatives.

The method also comprises a step 106 which consists of increasing the value of the component v such that the probability, knowing the value of v, of noticing the actual transmission of a control word k' with value k or of content M' with value M is close to 1.

The method comprises a step 105 of returning the value of v when the measurement of the probability p(k,M|v) of noticing the actual transmission of a control word k' with value k or content M' with value M is close to 0, while the measurement of said probability p(k,M|v−1), knowing the value of v−1, is close to 1. The device in which the identifier is i=v is recognised as being a traitor device.

If n is the number of devices issued by an operator and the identifiers of said devices are respectively comprised in [1,n], then such a method makes it possible to identify a traitor device with n measures of probability.

FIG. 6 depicts a second embodiment of a method for identifying a traitor device in accordance with the invention.

According to said method, a dichotomy is applied in order to obtain a result in log n as a measure of probability p(k,M|v).

Thus, such a method comprises a first step 200 which consists of initialising a and b, two numbers such that a=1 and b=n, n being the maximum value of the component v of a control word produced by a server 3 of an operator.

The value of the component v is calculated in 201 such that v=(a+b)/2.

The method comprises a step 202 of broadcasting a pair (C, c) towards the terminals. The method then consists of measuring 203 a probability p(k,M|v) of noticing the actual transmission of a control word k' identical to k or of content M' with value M, knowing the value of v.

In 204, the method consists of assessing whether a−1=b.

If so, then the method returns in 205 i=b. The device in which the identifier is equal to i is recognised as being a traitor device.

Otherwise, the method consists of assessing, in 206, the probability p(k,M|v) of noticing the actual transmission, over the pirate network 6, of a control word k' identical to k or of content M' with value M, knowing the value v.

If said probability is close to 1, then the method consists of assigning 207 to a the value of v and of returning to step 201. Otherwise, the method consists, in 208, of assigning to b the value of v and of returning to step 201.

FIG. 7 presents a third embodiment of a tracking method for identifying a traitor device.

According to this embodiment, the identifier i is a vector of z integers with values i=($i_1$, . . . , $i_z$) each comprised in a set [1,m] , m and z being integers higher than 1. Moreover, the component v is a vector of z integers with values v=($v_1$, . . . , $v_z$) each comprised in a set [0,m].

In order to use the tracking method, every electronic subscriber device produces a control word k' that is:
identical to k if the value of each integer $v_1$ is respectively strictly lower than the value of each integer $i_1$ for every 1 comprised between 1 and z,
distinct from k (in which the value k'=kf is different from that of k, or broadcast with a delay such that k'=kd) otherwise.

The method for tracking a traitor device consists first of all of initialising in 300 an integer l such that l=1 and the component v, as a vector of z integers, such that v=(0, . . . , 0).

The method comprises a step 301 of increasing $v_1$ such that, in 304, the probability, knowing the value of v, of respectively noticing the actual transmission of a control word k' identical to k or of content M' identical to M over a pirate network is close to 1.

Otherwise, the method consists, in 305, of decreasing $v_1$ and increasing l such that, in 306, the value of l is no higher than z. In this case, the method consists of returning to step 301.

The step 307 of identifying a traitor device consists of returning the value of v when, in 305, the value of l is higher than z. The devices in which the identifier is i=v is identified as being a traitor device.

Thus, according to this tracking method, a traitor device is recognised with z.m measures of probability. To obtain the minimum value of z.m with $m^z \geq n$, n being the number of devices, m=3, $z=\lceil \log_3 n \rceil$ and z.m=3.$\lceil \log_3 n \rceil$ measures of probability are obtained.

In order to identify a traitor device, the invention also provides for it to be possible to transmit one or more additional control words $k_1, \ldots, k_x$ in addition to the control word k. In the latter case, a message header enables every subscriber device to take into consideration the relevant control word. According to this alternative, a method for producing a control word in accordance with the invention can comprise a prior step of decoding said header in order to use the relevant control word. Said different control words can be identical, valid or partially invalid—in other words, not allowing content to be decoded.

The invention claimed is:

1. A method for producing a control word k', comprising:
a step of receiving, by an electronic device, an encrypted control word c from a terminal,
a step of applying to the encrypted control word c a decryption function D by a processor of said electronic device, and thus of calculating a decrypted word k such that k=D(c), wherein the decrypted word k comprises a component v,
a step of selectively producing a control word k' that is distinct from k according to a result of a comparison operation between the value of v and that of an identifier i that is exclusive to the device, wherein the control word k' is:
identical to k if the value of the component v is lower than the value of the identifier l; and
distinct from k if the value of the component v is greater than or equal to the value of the identifier l, and
a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content.

2. A method for identifying an electronic device, comprising:
a step of producing a control word k, by determining the value of a component v of said control word;
a step of producing an encrypted control word c by encrypting said control word k by means of an encryption function E, such that c=E(k);
a step of broadcasting said encrypted control word c via a broadcast network towards terminals, including a pirate terminal configured to broadcast, via a pirate network, a control word k' produced by an electronic device;
a step of observing the pirate network, by measuring a probability p(k/v) of noticing the actual transmission of the control word k' with value k, knowing the value of v; and
an identification step which comprises returning a value directly linked to the identifier i of said electronic device device that has produced a control word k' according to the method of claim 1 broadcast via the pirate network, according to the value of v and the measurement of said probability p(k/v).

3. A method for producing a control word k', comprising:
a step of receiving, by an electronic device, an encrypted control word c from a terminal,
a step of applying to the encrypted control word c a decryption function D by a processor of said electronic device, and thus of calculating a decrypted word k such that k=D(c), wherein the decrypted word k comprises a component v, and
a step of selectively producing a control word k' according to the result of a comparison operation between the value of v and that of an identifier i that is exclusive to the device, and
a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content, wherein:
the identifier i is a vector of z integers with values $i=(i_1, \ldots, i_z)$ contained in a set [1,m], m and z being integers higher than 1;
the component v is a vector of z integers with values $v=(v_1, \ldots, v_z)$ contained in a set [0,m];
and the step of producing the control word k' comprises producing a word that is:
identical to k if the value of each integer $v_l$, is respectively lower than the value of each integer $i_l$, for every l between 1 and z,
distinct from k, if the value of each integer $v_l$, is respectively greater than or equal to the value of each integer $i_l$, for every l between 1 and z.

4. A method for identifying an electronic device, said method comprising:
a step of producing a control word k, by determining the value of a component v of said control word;
a step of producing an encrypted control word c by encrypting said control word k by means of an encryption function E, such that c=E(k);
a step of broadcasting said encrypted control word c via a broadcast network towards terminals, including a pirate terminal configured to broadcast, via a pirate network, a control word k' produced by an electronic device;
a step of observing the pirate network, by measuring a probability p(k/v) of noticing the actual transmission of the control word k' with value k, knowing the value of v; and
an identification step which comprises returning a value directly linked to the identifier i of said electronic device that has produced a control word k' according to the method of claim 3 broadcast via the pirate network, according to the value of v and the measurement of said probability p(k/v).

5. A method for producing a control word k', comprising:
a step of receiving, by an electronic device, an encrypted control word c from a terminal,
a step of applying to the encrypted control word c a decryption function D by a processor of said electronic device, and thus of calculating a decrypted word k such that k=D(c), wherein the decrypted word k comprises a component v,
a step of selectively producing a control word k' that is distinct from k according to the result of a comparison operation between the value of v and that of an identifier i that is exclusive to the device, wherein the control word comprises a component t,
a step of interpreting said component t in order to produce the control word k' from v, i and k, and
a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content.

6. A method according to claim 5, wherein the step of producing the control word k' that is distinct from k comprises producing a word k'=kf in which the value kf is different from the value of k.

7. A method according to claim 5, wherein the step of producing the control word k' that is distinct from k consists of using a delay function such that the issuing means issues a control word k'=kd in which the value is equal to k after a pre-determined period of time.

8. A method according to claim 5, further comprising a step of storing information Rp for indicating permanent revocation of the device if the component t is equal to a pre-determined value $t_p$ and if the component v is equal to the value of the identifier i.

9. A method according to claim 5, further comprising a step of deleting information Rp for indicating permanent revocation of the device if the component t is equal to a pre-determined value $t_a$ and if the component v is equal to the value of the identifier i.

10. A method for identifying an electronic device, said method comprising:
a step of producing a control word k, by determining the value of a component v of said control word;
a step of producing an encrypted control word c by encrypting said control word k by means of an encryption function E, such that c=E(k);
a step of broadcasting encrypted control word c via a broadcast network towards terminals, including a pirate terminal configured to broadcast, via a pirate network, a control word k' produced by an electronic device;
a step of observing the pirate network, by measuring a probability p(k/v) of noticing the actual transmission of the control word k' with value k, knowing the value of v; and
an identification step which comprises returning a value directly linked to the identifier i of the electronic device that has produced the control word k' broadcast via the pirate network according to the method of claim 5, according to the value of v and the measurement of said probability p(k/v).

11. A method according to claim 10, further comprising producing a control word k' by:
applying to the encrypted control word c a decryption function D, and thus calculating a decrypted word k such that k=D(c), wherein the decrypted word k comprises a component v, and
producing the control word k' respectively identical to or distinct from k according to the result of a comparison operation between the value of v and that of an identifier i that is exclusive to the device;
and further comprising one or more iterations in which:
the step of determining the component v comprises:
previously initialising a value v at 0;
increasing the value of the component v such that the probability, knowing the value of v, of noticing the actual transmission of a control word k' with value k or of content M' with value M is close to 1;
and wherein the identification step comprises returning the value of v when the measurement of said probability, knowing the value of v, of noticing the actual transmission of a control word k' with value k or of content M' with value M is close to 0 when the measurement of said probability, knowing the value of v−1, is close to 1.

12. A method according to claim 10, further comprising producing a control word k' by :
applying to the encrypted control word c a decryption function D, and thus calculating a decrypted word k such that k=D(c), wherein the decrypted word k comprises a component v, and
producing the control word k' respectively identical to or distinct from k according to the result of a comparison operation between the value of v and that of an identifier i that is exclusive to the device;
and further comprising one or more iterations in which:
the step of determining a component v comprises:
previously initialising a and b, two numbers such that a =1 and b =n, n being the maximum value of the component v;
calculating the value of the component such that v=(a+b)/2;
assigning to a the current value of v such that the probability, knowing the value of v, of noticing the actual transmission of a control word k' with value k or of content M' with value M is close to 1;
assigning to b the current value of v such that the probability, knowing the value of v, of noticing the actual transmission of a control word k' with value k or of content M' with value M is not close to 1;
and wherein the identification step consists of returning the value of v when the value a−1 is equal to b.

13. A method according to claim 10, further comprising producing a control word k' by:
applying to the encrypted control word c a decryption function D, and thus calculating a decrypted word k such that k=D(c), wherein the decrypted word k comprises a component v, and
a step of producing the control word k' respectively identical to or distinct from k according to the result of a comparison operation between the value of v and that of an identifier i that is exclusive to the device;
and further comprising one or more iterations in which:
the step of determining a component v comprises:
previously initialising an integer l such that l=1 and v, as a vector of z integers, such that v=(0, . . . , 0);
increasing $v_l$ such that the probability, knowing the value of v, of respectively noticing the actual transmission of a control word k' with value k or of content M' with value M is close to 1;
decreasing $v_l$, and increasing l such that the probability, knowing the value of v, of noticing the actual transmission of a control word k' with value k or of content M' with value M is not close to 0 and that the value of l is no higher than z;
the identification step consists of returning the value of v when the value of l is higher than z.

14. A method for identifying an electronic device, said method comprising:
a step of producing a control word k, by determining, the value of a component v of said control word;
a step of producing an encrypted control word c by encrypting said control word k by means of an encryption function E, such that c =E(k);
a step of producing encrypted content C by encoding content M by means of said control word k and an encoding function enc such that C =enc(k,M);
a step of broadcasting said encrypted control word c together with said encrypted content C via the broadcast network towards terminals including a pirate terminal, said pirate terminal configured to broadcast, via a pirate network, content M' previously produced by said terminal by decoding said encrypted content C by means of a control word k' and a decoding function dec such that M'=dec(k',C);

a step of observing the flow of said pirate network by measuring a probability p(M/v) of noticing the actual transmission of content M' with value M, knowing the value of v; and an identification step which comprises returning a value directly linked to the identifier i of an electronic device that has produced said control word k' according to the method of claim 5 that has been used by the pirate terminal to create content M' broadcast via the pirate network, according to the value of v and the measurement of said probability p(M/v).

15. An electronic device interacting with a terminal, said device comprising:

an interface for receiving an encrypted control word c from the terminal;

a processor for producing a control word k' according to said encrypted control word c;

an interface for providing, to said terminal, said control word produced in response to receiving the encrypted control word c, and a memory storing an identifier i, wherein said processor produces the control word k' by the following steps:

a step of receiving, by the electronic device, the encrypted control word c from the terminal, a step of applying to the encrypted control word c a decryption function D by the processor of said electronic device, and thus of calculating a decrypted word k such that k=D(c), wherein the decrypted word k comprises a component v, a step of selectively producing the control word k' that is distinct from k according to the result of a comparison operation between the value of v and that of the identifier i that is exclusive to the device, wherein the control word comprises a component t, a step of interpreting said component t in order to produce the control word k' from v, i and k, and a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content.

16. An electronic device according to claim 15, processor implements a delay function to cause the providing interface to issue a control word k' whose value is equal to k after a pre-determined period of time.

17. An electronic device according to claim 15, further comprising a memory storing information Rp indicating permanent revocation of said device, and wherein the processor interacts with said memory to produce a control word k' whose value is distinct from k when the information Rp is equal to a value that indicates permanent revocation of the device.

18. An electronic device according to claim 15, further comprising a memory storing a word with a value kf that is different from the value of k.

19. An electronic device interacting with a terminal, said device comprising:

an interface for receiving an encrypted control word c from the terminal;

a processor for producing a control word k' according to said encrypted control word c;

an interface for providing, to said terminal, said control word produced in response to receiving the encrypted control word c, and a memory storing an identifier i, wherein said processor produces the control word k' by the following steps:

a step of receiving, by an electronic device, an encrypted control word c from a terminal, a step of applying to the encrypted control word c a decryption function D by a processor of said electronic device, and thus of calculating a decrypted word k such that k=D(c), wherein the decrypted word k comprises a component v, a step of selectively producing a control word k' that is distinct from k according to a result of a comparison operation between the value of v and that of an identifier i that is exclusive to the device, wherein the control word k' is:

identical to k if the value of the component v is lower than the value of the identifier l; and distinct from k if the value of the component v is greater than or equal to the value of the identifier l, and a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content.

20. An electronic device interacting with a terminal, said device comprising:

an interface for receiving an encrypted control word c from the terminal;

a processor for producing a control word k' according to said encrypted control word c;

an interface for providing, to said terminal, said control word produced in response to receiving the encrypted control word c, and a memory storing an identifier i, wherein said processor produces the control word k' by the following steps:

a step of receiving, by an electronic device, an encrypted control word c from a terminal, a step of applying to the encrypted control word c a decryption function D by a processor of said electronic device, and thus of calculating a decrypted word k such that k=D(c), wherein the decrypted word k comprises a component v, and a step of selectively producing a control word k' according to the result of a comparison operation between the value of v and that of an identifier i that is exclusive to the device, and a step of issuing said control word k' to said terminal by said electronic device, said terminal being configured to decode content based on the issued control word k' such that, if the issued control word k' is identical to k, the content is decoded correctly, and, if the issued control word k' is distinct from k, said terminal is unable to decode the content, wherein:

the identifier i is a vector of z integers with values i= $(i, \ldots, i_z)$ contained in a set [1,m], m and z being integers higher than 1;

the component v is a vector of z integers with values v= $(v, \ldots, v_z)$ contained in a set [0,m];

and the step of producing the control word k' comprises producing a word that is:

identical to k if the value of each integer $v_l$, is respectively lower than the value of each integer $i_l$, for every l between 1 and z, distinct from k if the value of each integer $v_l$, is respectively greater than or equal to the value of each integer $i_l$, for every l between 1 and z.

* * * * *